United States Patent Office 2,861,879
Patented Nov. 25, 1958

2,861,879
METHOD FOR THE PRODUCTION OF IRON FROM STEEL SCRAP

Max Michalke, Rheydt, Germany, assignor to Easton Metal Powder Company Incorporated, New York, N. Y., a corporation of New York No Drawing. Application March 25, 1957
Serial No. 647,976

Claims priority, application Germany October 14, 1953

5 Claims. (Cl. 75—.5)

This invention relates to the production from steel scrap or iron and particularly to the production of iron having high carbon, low silicon and low sulfur contents, which is suitable for the production of iron powder.

This application is a continuation-in-part of my application Serial No. 416,934 of the same title, filed March 17, 1954, now abandoned.

Powdered iron metal has come into increasing use for the production of articles by processes in which the powdered iron is put into a mold under a high pressure and then sintered. Iron powder suitable for use in such processes may be made by atomizing a liquid iron. It is necessary that the liquid iron which is atomized have a carbon content in excess of about 3%, and preferably in the range between about 3.5% and 4.5%, and low silicon and sulfur contents. In general, the silicon content may sometimes rise to 0.5%, but preferably should not be more than about 0.2% and the sulfur may sometimes rise to 0.15%, but preferably should not be more than about 0.07%.

Pig-iron of this description can be obtained for example by smelting iron ore, as in the so-called Steurzelberg iron; but it is extremely expensive. It has therefore been a goal of the steel industry to produce iron having the qualities described by melting down steel scrap, as for example, in the familiar cupola furnace.

For many years, it has been common practice in the steel industry to melt down steel scrap with coke in an acid-lined cupola furnace to obtain an iron-carbon alloy having the composition of ordinary pig iron. Such alloys, however, are not suitable for the production of iron powder because they do not have the high carbon and low silicon and sulfur contents required. It is possible to take the pig iron obtained from such a conventional melt and subject it to an additional operation to decrease the sulfur and silicon content and to increase the carbon content. For example, the liquid iron can be treated with sodium bicarbonate, calcium carbide or metallic magnesium to remove sulfur and silicon and then treated with graphite to bring the carbon content to the desired level. Such additional operations, however, increase the cost of the end-product and are always accompanied by a loss in temperature of the liquid iron which may require reheating.

It has also been proposed to obtain a low-sulfur, low-silicon iron by melting steel scrap with coke in a basic-lined cupola with the production of a basic slag. Such processes, however, are not satisfactory because it is hard to keep the basic slag in a liquid state, especially in smaller size furnaces.

According to the present invention, these difficulties are overcome and iron suitable for atomizing to form iron powder is produced from steel scrap by melting the scrap in a furnace using electrode-carbon as a fuel. Preferably an acid-lined furnace is employed. Electrode carbon may be defined as graphitic or amorphous carbon having an ash content below about 2% and a sulfur content below about 0.2%, which has been subjected to a sintering operation at temperatures in excess of 1800° C.

A convenient source of supply of electrode carbon is the scrap electrodes from electrolytic cells and electric furnaces.

Carbon electrodes are well known for use in various industrial processes, for example, in the production of chlorine by the electrolysis of brine. Such electrodes may be of either graphitic or amorphous carbon. They are produced by heating a low-ash coal or coke to extremely high temperatures in excess of 1800° C. so that a large proportion of the ash ingredients and all the volatile matter is removed in gaseous form. If the heating is carried out at temperatures in excess of about 2,000° C., the resulting electrode is crystalline graphite. If the temperature is kept below 2,000° C., the product will be generally amorphous. Generally speaking, it is preferred to use graphite electrode carbon because graphite electrodes will contain less silicon and sulfur and, therefore, the iron will take up less silicon and sulfur than with amorphous electrodes. It is found that as a practical matter, however, the electrodes in general industrial use are seldom completely graphitic or completely amorphous, but are mixtures of crystalline and amorphous carbon.

The physical size of the pieces of electrode carbon used is not critical. Generally, powdered fuel will not be used because it will tend to unduly retard passage of air through the fuel bed. Usually the fuel lumps will be between about 2 and about 20 inches in diameter, preferably between about 4 and about 10 inches in diameter.

The type of steel used in the melt may vary between wide limits depending on the use to which the iron is to be put. Where the iron is to be used for iron powder, the steel should have a silicon content below about 0.25%, and a sulfur content below about 0.06%. Steels having low chromium contents, for example below about 0.10%, are preferred. The liquid iron produced in the present process will be found to have a lower sulfur content than that of the steel charged to the furnace.

It has been stated that the present process is preferably carried out in an acid-lined furnace. The term "acid lining" is used in its common sense to mean a lining rich in silicious components. The present invention may also be used in basic-lined cupolas, provided the temperature of the furnace is kept sufficiently high, as by using oxygen, to prevent solidification of the slag.

It is found that not only does the use of electrode carbon, according to the present invention, permit more carbon to be taken up by the iron than conventional fuels such as coke, at the same time keeping the silicon and sulfur contents down, but surprisingly enough gives an iron which will flow freely at temperatures which are in no case higher than have hitherto been experienced using coke, and which may be substantially lower. Thus, while it is common practice to increase the carbon content of iron by adding graphite to the molten metal, it has generally been thought impossible to use graphitic carbon as fuel because of its refractory nature. Surprisingly, it has been found that when electrode carbon is used as the sole fuel and the sole carbonaceous element in an acid-lined cupola furnace charge, iron flows freely from the tap hole at temperatures between about 1250° C. and about 1500° C. This is true whether the electrode carbon is amorphous or graphitic in nature. A comparable operation employing coke would have a tap hole temperature of not lower than about 1400° C., and might be as high as 1550° C.

Moreover, it is found that iron made according to the present process has an extremely high fluidity. This is particularly valuable in atomizing iron for formation of iron powder.

The present invention may be carried out in the ordinary cupola furnace, without preheating the combustion air or enriching it with oxygen. Moreover, because with the present invention, it is possible to keep the temperature of the melt comparatively low, furnace linings are damaged a great deal less than with higher temperature processes using coke as a fuel.

The following specific examples are given to illustrate the process, it being understood that it is in no way intended to limit the scope of the invention to the conditions given in these examples.

*Example I*

An acid-lined cupola furnace having a diameter of approximately 24 inches was charged with steel scrap having an analysis approximately as follows:

| | |
|---|---|
| Carbon | 0.08 to 0.12%. |
| Silicon | 0.15% (max.). |
| Manganese | 0.4%. |
| Phosphorus | 0.035% (max.). |
| Sulfur | 0.035% (max.). |

The charge also contained as the sole carbonaceous component approximately 16% electrode graphite of the type commonly used for chlorine alkali electrolysis in the form of chunks two inches in diameter and larger. The graphite contained less than 0.3% ash and less than 0.01% sulfur. Approximately 2%, on the weight of the charge, of limestone was added to aid in the formation of slag. The melt was carried out in conventional manner using air in the tuyeres, without preheating and the liquid iron obtained had the following analysis:

| | Percent |
|---|---|
| Carbon | 4.3 |
| Silicon | 0.04 |
| Manganese | 0.15 |
| Phosphorus | 0.032 |
| Sulfur | 0.025 |

The temperature at the tap hole was measured and found to range between 1350° C. and 1400° C.

*Example II*

A similar charge as described in Example I was formed in the same cupola furnace except that the electrode carbon used was largely amorphous carbon of the type commonly employed in fused-salt electrolyses. The liquid iron so obtained had the following analysis:

| | Percent |
|---|---|
| Carbon | 4.1 |
| Silicon | 0.05 |
| Manganese | 0.14 |
| Phosphorus | 0.035 |
| Sulfur | 0.030 |

The temperature at the tap hole was measured and found to range between about 1350° C. and 1420° C.

The molten iron-carbon alloy is atomized with compressed air in known apparatus. The molten metal is poured from a ladle through a tun dish down a center pipe or passage coaxially located within an annular nozzle. The iron is atomized by compressed air issuing from the nozzle in an annular slit around the center pipe. Preferably the nozzle is directed vertically downward and the atomized iron, partly oxidized is quenched in a water tank below the nozzle. The atomization is uniform and economical.

Preferably air pressures from 2 to 6 atmospheres, above atmospheric, are employed. From the viewpoint of compacting technique, air pressures over 3.5 atms. give extremely good results, with smaller particle sizes being obtained as the pressure is increased.

It is necessary to maintain the pouring temperatures with precision of plus or minus 20° C. (36° F.) in order to produce a powder of the desired final composition.

The atomizing time should be limited to about ten minutes per ton of metal in order to avoid an unduly great drop in temperature.

The following ranges will preferably be employed: Pouring stream area from 110 to 240 mm.$^2$ (0.17–0.37 square inch); width of the nozzle slit for air 2.6 to 4.2 mm. (0.10–0.165 inch); and air pressure 2.0 to 6.0 atms. above atmospheric.

During atomization of the molten metal with air, a partial combustion of the iron and carbon takes place, which appreciably raises the surface temperature of the droplets.

Because of the oxidizing effects during atomization, carbon monoxide is generated in the molten metal, which puffs up the metal droplets into hollow spheres, usually with a hole in them, or which causes them to burst into pieces; on the surface a liquid slag of iron oxides is formed, which coats the particles after their solidification, as a strongly adhering layer of scale.

The iron droplets enveloped in the hot liquid iron oxide slag are quenched in the water of the atomizer, rendering both zones particularly brittle. The powder may be crushed as readily as glass by rollers or grinders into extremely fine dust.

The untreated powder is then annealed in a closed furnace, to which no reducing atmosphere is intentionally added from exterior sources. The temperature in the furnace may vary from 950° C. (1740° F.) to 1300° C. (2370° F.). Oxygen and carbon escape in the form of carbon monoxide-carbon dioxide mixture, and there remains iron powder low in carbon and substantially free from oxide. During the anneal, the former metal zone of the particles becomes porous as a result of the decarburizing oxidation, while the layer of scale changes into sponge iron because of the reduction. The iron powder which cakes up during the anneal is crushed and screened, and is then ready for compacting.

From the foregoing description, it will be seen that the invention provides a method for the production of a high-carbon, low sulfur, and low-silicon iron using materials which are essentially waste products. The invention thereby fills a need which has hitherto only been met by means of a vastly more expensive procedure.

While coke and other carbonaceous fuels can be introduced in small quantities along with electrode carbon, in the process of the invention, there is no particular advantage in so doing. The effect will be in general to decrease the carbon content, increase the sulfur and silicon contents of the product, and increase the temperature of the melt. In no case should the coke exceed 50% of the total fuel charged.

What is claimed is:

1. The process for the manufacture of iron powder from iron having a carbon content in excess of 3%, a silicon content below 0.5%, and a sulphur content below about 0.15%, which comprises melting steel scrap in an acid-lined cupola furnace by means of a fuel consisting essentially of electrode carbon and atomizing the molten iron thus produced by means of an oxidizing gas under pressure thereby to provide a granular product containing iron, carbon and oxygen, together with small amounts of silicon and sulphur.

2. The process for the manufacture of iron powder from iron having a carbon content in excess of 3%, a silicon content below 0.5%, and a sulphur content below about 0.15%, which comprises melting steel scrap in an acid-lined cupola furnace by means of a fuel consisting essentially of electrode carbon and atomizing the molten iron thus produced by means of an oxidizing gas under pressure thereby to provide a granular product containing iron, carbon and oxygen, together with small amounts of silicon and sulphur, and heating said granular product to a temperature between about 950° C. and about 1300° C. in a furnace to which no reducing atmosphere is intentionally added from exterior sources, to simultaneously reduce and decarburize the material for production of a powder low in carbon and substantially free from oxide.

3. The process for manufacturing iron powder from iron having a carbon content from about 3.5% to about 4.5% approximately, a silicon content below about 0.2% approximately, and a sulphur content below about 0.07% approximately, which comprises melting steel scrap in an acid-lined cupola furnace by means of a fuel consisting essentially of electrode carbon, and atomizing the molten iron thus produced by means of an oxidizing gas under pressure thereby to provide a granular product containing iron, carbon and oxygen, together with small amounts of silicon and sulphur.

4. The process for manufacturing iron powder from iron having a carbon content from about 3.5% to about 4.5% approximately, a silicon content below about 0.2% approximately, and a sulphur content below about 0.07% approximately, which comprises melting steel scrap in an acid-lined cupola furnace by means of a fuel consisting essentially of electrode carbon, and atomizing the molten iron thus produced by means of an oxidizing gas under pressure thereby to provide a granular product containing iron, carbon and oxygen, together with small amounts of silicon and sulphur, and heating said granular product to a temperature between about 950° C. and about 1300° C. in a furnace to which no reducing atmosphere is intentionally added from exterior sources, to simultaneously reduce and decarburize the material for production of a powder low in carbon and substantially free from oxide.

5. The process for manufacturing iron powder from iron having a carbon content from about 3.5% to about 4.5% approximately, a silicon content below about 0.2% approximately, and a sulphur content below about 0.07% approximately, which comprises melting steel scrap in an acid-lined cupola furnace by means of a fuel consisting essentially of electrode carbon, introducing a stream of high pressure oxygen-containing gas to said furnace to cause combustion of said electrode carbon and melting and carburization of said steel scrap, and atomizing the molten iron thus produced by means of an oxidizing gas under pressure thereby to provide a granular product containing iron, carbon and oxygen, together with small amounts of silicon and sulphur.

References Cited in the file of this patent

UNITED STATES PATENTS

| | | |
|---|---|---|
| 92,480 | Shaw | July 13, 1869 |
| 2,164,727 | Westberg | July 4, 1939 |

OTHER REFERENCES

Paper No. 13, presented at the 41st General Meeting of the American Electrochemical Society held in Baltimore, Md., April 28, 29, 1922, pages 161, 165, 166, 167 and 168.

Foundry Trade Journal, September 30, 1937, pages 263–264, London, England.

Foundry Trade Journal, July 16, 1953, pages 73–78, published as noted above.